(12) United States Patent
Cheng

(10) Patent No.: US 12,106,166 B2
(45) Date of Patent: Oct. 1, 2024

(54) FLEXIBLE CARD HAVING A TRANSACTION DISPLAY INCLUDING A FLEXIBLE DISPLAY UNIT AND LIGHT EMITTING UNIT

(71) Applicant: ANICA CORPORATION, New Taipei (TW)

(72) Inventor: Meng-Jen Cheng, New Taipei (TW)

(73) Assignee: ANICA CORPORATION, New Taipei (TW)

( * ) Notice: Subject to any disclaimer, the term of this patent is extended or adjusted under 35 U.S.C. 154(b) by 0 days.

(21) Appl. No.: 18/466,856

(22) Filed: Sep. 14, 2023

(65) Prior Publication Data
US 2024/0095485 A1    Mar. 21, 2024

(30) Foreign Application Priority Data
Sep. 20, 2022 (TW) .................... 111135469

(51) Int. Cl.
*G06K 19/077* (2006.01)
*G06K 19/02* (2006.01)

(52) U.S. Cl.
CPC ..... *G06K 19/07707* (2013.01); *G06K 19/025* (2013.01); *G06K 19/07705* (2013.01)

(58) Field of Classification Search
None
See application file for complete search history.

(56) References Cited

U.S. PATENT DOCUMENTS

| 10,163,051 | B1* | 12/2018 | Cheng | G06K 19/07715 |
| 11,755,870 | B1* | 9/2023 | Liu | G02B 6/0035 362/84 |
| 2017/0357979 | A1* | 12/2017 | Khurana | G07F 7/0846 |
| 2019/0244210 | A1* | 8/2019 | Cheng | G06K 19/07705 |

FOREIGN PATENT DOCUMENTS

| CN | 103003827 B | 8/2017 |
| TW | I686767 B | 3/2020 |

\* cited by examiner

*Primary Examiner* — Suezu Ellis

(57) ABSTRACT

A flexible card having a transaction display is introduced. The flexible card includes a card body, a flexible electric control mechanism, a flexible display unit and a light emitting unit. The flexible card body includes a first plate and a second plate combined with each other. The flexible electric control mechanism is disposed between the first plate and the second plate and includes a circuit carrier board and transaction processing mechanism. The flexible display unit is disposed on the circuit carrier board and is electrically connected to the transaction processing mechanism. Thus, the flexible electric control mechanism can be stably combined in the flexible card body to improve structural stability and reliability. During use, the transaction processing mechanism performs a transaction with a payment apparatus, and the flexible display unit and the light emitting unit output transaction information, achieving enhanced transaction security and convenience.

9 Claims, 4 Drawing Sheets

FLEXIBLE CARD HAVING A TRANSACTION DISPLAY INCLUDING A FLEXIBLE DISPLAY UNIT AND LIGHT EMITTING UNIT

CROSS-REFERENCE TO RELATED APPLICATION

This non-provisional application claims priority under 35 U.S.C. § 119(a) on Patent Application No(s). 111135469 filed in Taiwan, R.O.C. on Sep. 20, 2022, the entire contents of which are hereby incorporated by reference.

BACKGROUND OF THE INVENTION

1. Field of the Invention

The present disclosure relates to a flexible card having a transaction display, and in particular to a flexible card that improves structural stability and reliability and achieves enhanced transaction security and convenience.

2. Description of the Related Art

Conventional display-type cards can be used to perform various transactions; however, they lack security verification mechanisms or transaction display mechanisms. As a result, personal data or transaction data related thereto is exposed to risks of theft, significantly degrading security of such electronic transaction cards.

Therefore, the present disclosure aims to disclose a flexible card having a transaction display, so as to improve structural stability and reliability and achieve enhanced transaction security and convenience, thereby improving the drawbacks of the prior art.

BRIEF SUMMARY OF THE INVENTION

In view of the drawbacks of the prior art above, the applicant has dedicated to research and development to overcome these drawbacks by providing a flexible card having a transaction display, so as to accomplish the objects of improving structural stability and reliability and achieving enhanced transaction security and convenience.

To achieve the above and other objects, the present disclosure provides a flexible card having a transaction display, the flexible card including a card body, a flexible electric control mechanism, a flexible display unit and a light emitting unit. The flexible card body includes a first plate and a second plate which are combined with each other. The flexible electric control mechanism is disposed between the first plate and the second plate and includes a circuit carrier board and transaction processing mechanism. The transaction processing mechanism is disposed on the circuit carrier board and performs a transaction with a transaction apparatus. The flexible display unit is disposed on the circuit carrier board and is electrically connected to the transaction processing mechanism, and provides a prompt when used in a transaction. The light emitting unit is disposed on the circuit carrier board and is electrically connected to the transaction processing mechanism, and provides a prompt when used in a transaction.

In the above flexible card having a transaction display, the circuit carrier board includes a graphics layer, a first circuit layer, a first separation layer and a first conductor layer. The first circuit layer is disposed on one surface of the first conductor layer. The first separation layer is disposed on one surface of the first circuit layer. The graphics layer is disposed on one surface of the first separation layer. The flexible display unit is disposed on one surface of the graphics layer.

In the above flexible card having a transaction display, a second separation layer can further be disposed between the first circuit layer and the first conductor layer.

In the above flexible card having a transaction display, the circuit carrier board includes a graphics layer, a first circuit layer, a first separation layer, a first conductor layer, a second separation layer and a second circuit layer. The second circuit layer is disposed on one surface of the first conductor layer. The second separation layer is disposed on one surface of the second circuit layer. The first circuit layer is disposed on one surface of the second separation layer. The first separation layer is disposed on one surface of the first circuit layer. The graphics layer is disposed on one surface of the first separation layer. The flexible display unit is disposed on one surface of the graphics layer.

In the above flexible card having a transaction display, a second conductor layer is further disposed between the second separation layer and the first circuit layer.

In the above flexible card having a transaction display, the transaction processing mechanism is a central processor, an integrated circuit chip or a logic circuit.

In the above flexible card having a transaction display, the flexible display unit is an electrophoretic display, a liquid crystal display, a bistable liquid crystal display, a multistable liquid crystal display, a flexible organic light emitting diode display, a flexible light emitting diode display or a flexible liquid crystal display.

In the above flexible card having a transaction display, the flexible display unit further includes a protection layer, which covers the flexible display unit.

In the above flexible card having a transaction display, the light emitting unit is provided with at least one light emitting portion and a light guiding portion, the light guiding portion encircles a periphery of the flexible card body, and the light emitting portion corresponds to the light guiding portion.

In the above flexible card having a transaction display, the light emitting portion is a light emitting diode, and the light guiding portion is a light guiding ink layer.

Thus, the flexible card having a transaction display of the present disclosure enables the flexible electric control mechanism to be combined in the flexible card body, so as to improve structural stability and reliability. When in use, the transaction processing mechanism performs a transaction with a payment apparatus, and the flexible display unit and the light emitting unit output a transaction message during the transaction, so as to achieve enhanced transaction security and convenience.

DETAILED DESCRIPTION OF THE INVENTION

To facilitate understanding of the object, characteristics and effects of this present disclosure, embodiments together with the attached drawings for the detailed description of the present disclosure are provided.

Figure 1:
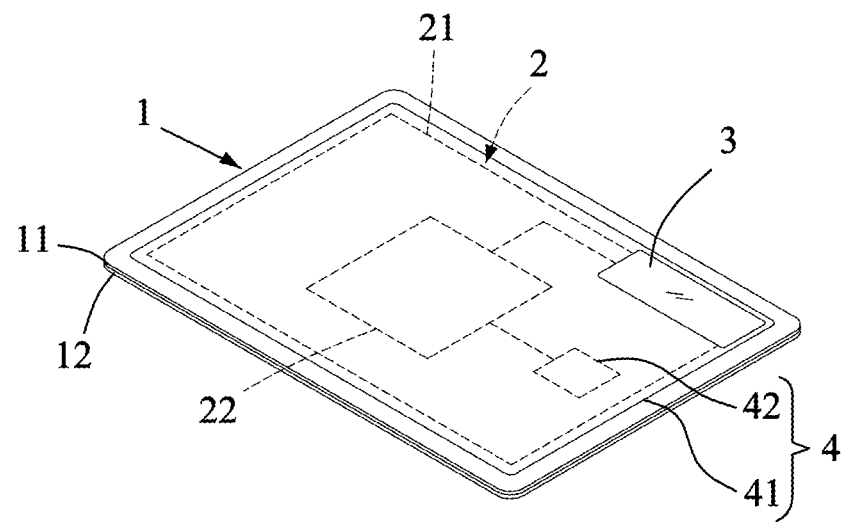
FIG. 1 is a schematic diagram of an appearance according to a first embodiment of the present disclosure.
Figure 2:
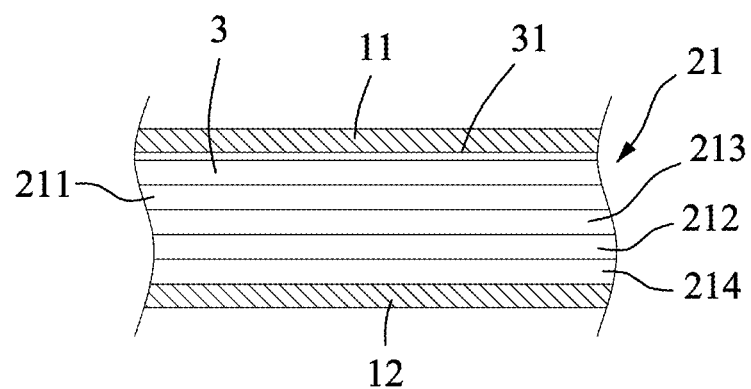
FIG. 2 is a section schematic diagram of a circuit carrier board according to the first embodiment of the present disclosure.
Figure 3:
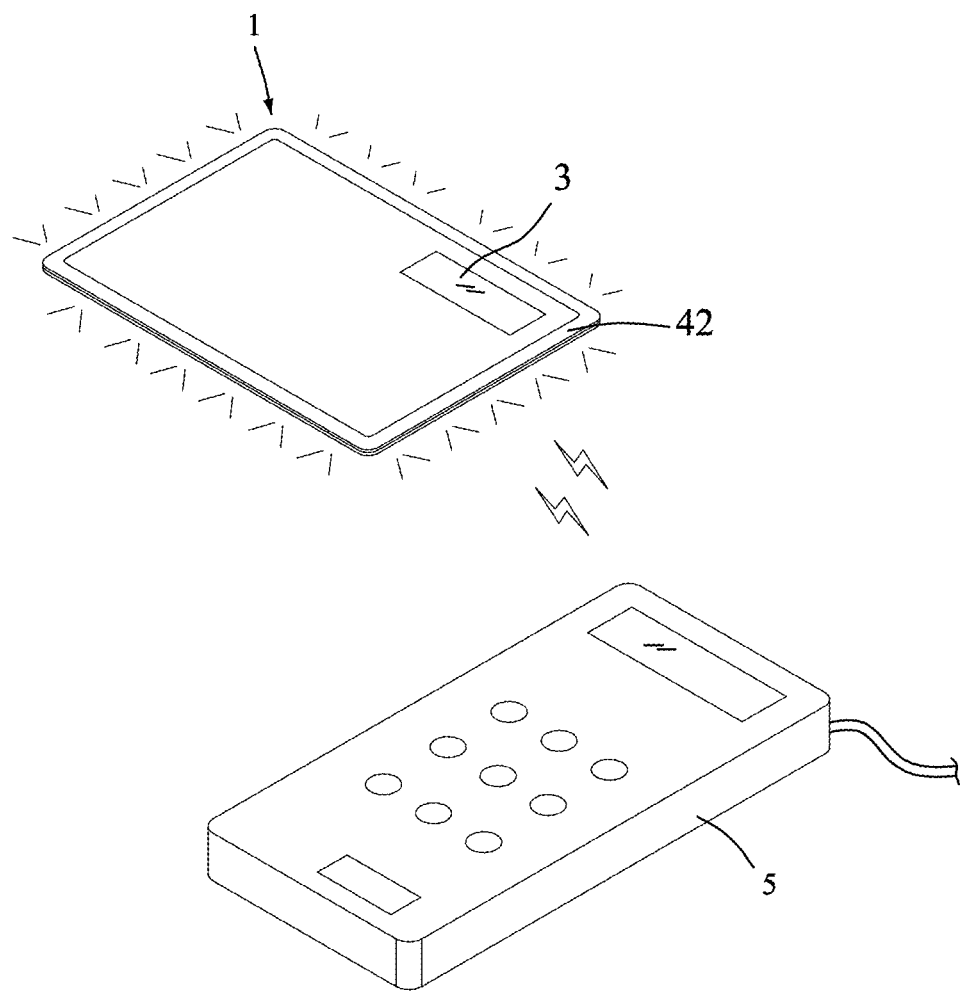
FIG. 3 is a schematic diagram of a state of use according to the first embodiment of the present disclosure.

Referring to FIG. 1 to FIG. 3, as shown in the drawings, the present disclosure provides a flexible card having a transaction display. The flexible card includes a flexible card body 1, a flexible electric control mechanism 2, a flexible display unit 3 and a light emitting unit 4.

The flexible card body 1 includes a first plate 11 and a second plate 12. The first plate 11 and the second plate 12 are combined with each other.

The flexible electric control mechanism 2 is disposed between the first plate 11 and the second plate 12 and includes a circuit carrier board 21 and a transaction processing mechanism 22. The transaction processing mechanism 22 is disposed on the circuit carrier board 21 and performs a transaction with a payment apparatus 5.

The flexible display unit 3 is disposed on the circuit carrier board 21 and is electrically connected to the transaction processing mechanism 22, and provides a prompt when used in a transaction.

The light emitting unit 4 is disposed on the circuit board 21 and is electrically connected to the transaction processing mechanism 22, and provides a prompt when used in a transaction.

To perform a transaction by using the present disclosure, a user can place the flexible card body 1 near the payment apparatus 5 for the transaction processing mechanism 22 to read electromagnetic waves from the payment apparatus 5, so as to sense and generate required power. Accordingly, once external power is acquired, the transaction processing mechanism 22 is activated to perform the transaction, and the transaction processing mechanism 22 drives the flexible display unit 3 and the light emitting unit 4 to output a message (for example, various text messages or light signals) of confirmation to inform a card holder that this transaction is currently being processed or has been processed. Thus, the transaction processing mechanism 22 is connected with the payment apparatus 5 to obtain power, and the flexible display unit 3 and the light emitting unit 4 output a transaction message, hence achieving transaction security and convenience.

When the transaction ends and the flexible card body 1 is removed, the transaction processing mechanism 22 is no longer capable of reading electromagnetic waves from the payment apparatus 5 and is thus powered off, and no longer supplies power to the transaction processing mechanism 22. Hence, the transaction processing mechanism 22 is in a power-off state, such that the flexible display unit 3 and the light emitting unit 4 no longer output any transaction message, so as to remind the card holder that the transaction has ended and the card is not in a state of use.

In addition to the above embodiments, in one embodiment of the present disclosure, the first plate 11 and the second plate 12 are combined to each other by a cold-press technique. As such, besides stably combining the first plate 11 and the second plate 12, the first plate 11 and the second plate 12 can further be used to stably cover the flexible electric control mechanism 2 (and the flexible display unit 3 and the light emitting unit 4 disposed at the flexible electric control mechanism 2). Thus, the flexible card body 1 can be used for securing and protection of the flexible electric control mechanism 2, and the flexible electric control mechanism 2 can be stably combined in the card body 1, thereby improving structural stability and reliability.

In addition to the above embodiments, in one embodiment of the present disclosure, the first plate 11 and the second plate 12 are formed of a transparent material. As such, viewing of the flexible display unit 3 and the light emitting unit 4 is made easy through the first plate 11 or the second plate 12.

In addition to the above embodiments, in one embodiment of the present disclosure, the transaction processing mechanism 22 can be a central processor, an integrated circuit chip or a logic circuit, such that the transaction processing mechanism 22 can perform operation processing during a transaction and perform operation processing during operations of the flexible display unit 3 and the light emitting unit 4.

In addition to the above embodiments, in one embodiment of the present disclosure, the flexible display unit 3 can be an electrophoretic display, a liquid crystal display, a bistable liquid crystal display, a multistable liquid crystal display, a flexible organic light emitting diode display, a flexible light emitting diode display or a flexible liquid crystal display, so that the flexible display unit 3 can meet display application requirements for outputs of different cards.

In addition to the above embodiments, in one embodiment of the present disclosure, the flexible display unit 3 further includes a protection layer 31. The protection layer 31 covers the flexible display unit 3, and is formed of a plastic or high polymer material, for example, polyethylene terephthalate (PET) or polyvinylchloride (PVC). As such, the protection layer 31 can serve as protection for the flexible display unit 3.

In addition to the above embodiments, in one embodiment of the present disclosure, the light emitting unit 4 is provided with at least one light emitting portion 41 and a light guiding portion 42. The light guiding portion 42 encircles a periphery of the flexible card body 1. The light emitting portion 41 corresponds to the light guiding portion 42. The light emitting portion 41 is a light emitting diode, and the light guiding portion 42 is a light guiding ink layer.

On the basis of the above embodiments, when the transaction processing mechanism 22 drives the light emitting unit 4 to output a confirmation message or a transaction message, the transaction processing mechanism 22 can drive the light emitting portion 41 such that the light guiding portion 42 receives and guides a light source of the light emitting portion 41 to the exterior, hence generating a light emitting effect at the periphery of the flexible card body 1. With the coordination of the flexible display unit 3, the card holder is informed of a related spending message, thereby enhancing transaction security and convenience.

In addition to the above embodiments, in one embodiment of the present disclosure, the circuit carrier board 21 includes a graphics layer 211, a first circuit layer 212, a first separation layer 213 and a first conductor layer 214. The first circuit layer 212 is disposed on one surface of the first conductor layer 214. The first separation layer 213 is disposed on one surface of the first circuit layer 212. The graphics layer 211 is disposed on one surface of the first separation layer 213. The flexible display unit 3 is disposed on one surface of the graphics layer 211. Thus, the circuit carrier board 21 can be made into a multi-layer substrate, and the first separation layer 213 can be made of an FR4, FR5, polyimide (PI), PET, PVC, printed circuit board (PCB), or polyethylene naphthalate (PEN) material. Moreover, the circuit carrier board 21 can also be an organic thin film transistor (OTFT), or the circuit carrier board 21 can be made by means of printing, silver paste, carbon ink printing or circuit etching. Moreover, the first circuit layer 212 can be protected by the first conductor layer 214, so as to prevent the first circuit layer 212 from oxidation and moisture, so that the circuit carrier board 21 can better meet actual application requirements.

Figure 4:
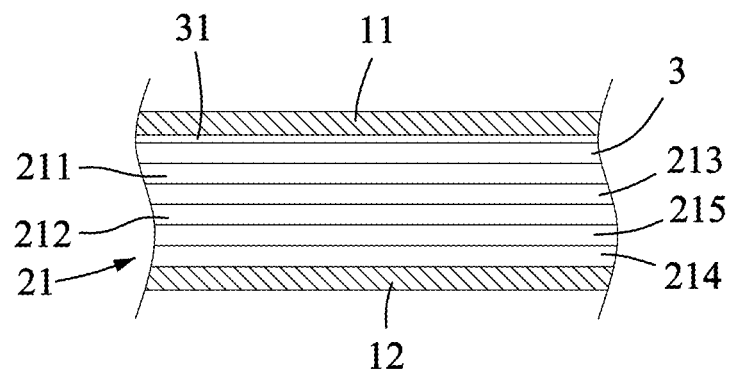
FIG. 4 is a section schematic diagram of a circuit carrier board according to a second embodiment of the present disclosure.

Referring to FIG. 4, as shown in the drawing, in addition to the above embodiments, in one embodiment of the present disclosure, a second separation layer 215 can be further provided between the first circuit layer 212 and the first conductor layer 214, so that the circuit carrier board 21 can better meet actual application requirements.

Figure 5:
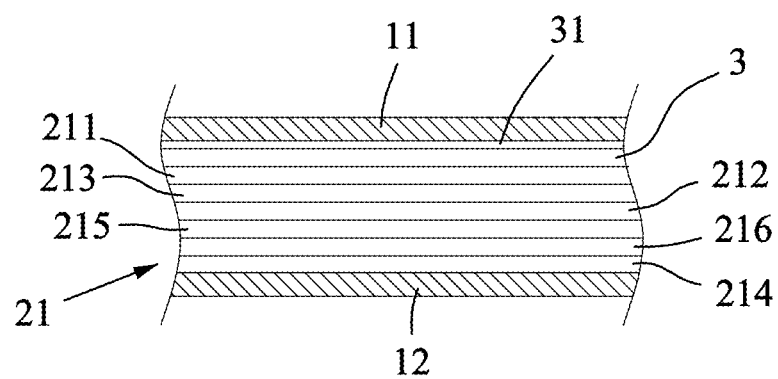
FIG. 5 is a section schematic diagram of a circuit carrier board according to a third embodiment of the present disclosure.

Referring to FIG. 5, as shown in the drawing, in addition to the above embodiments, in one embodiment of the present disclosure, the circuit carrier board 21 includes a graphics layer 211, a first circuit layer 212, a first separation layer 213, a first conductor layer 214, a second separation layer 215 and a second circuit layer 216. The second circuit layer 216 is disposed on one surface of the first conductor layer 214. The second separation layer 215 is disposed on one surface of the second circuit layer 216. The first circuit layer 212 is disposed on one surface of the second separation layer 215. The first separation layer 213 is disposed on one surface of the first circuit layer 212. The graphics layer 211 is disposed on one surface of the first separation layer 213. The flexible display unit 3 is disposed on one surface of the graphics layer 211. Thus, the circuit carrier board 21 can better meet actual application requirements.

Figure 6:
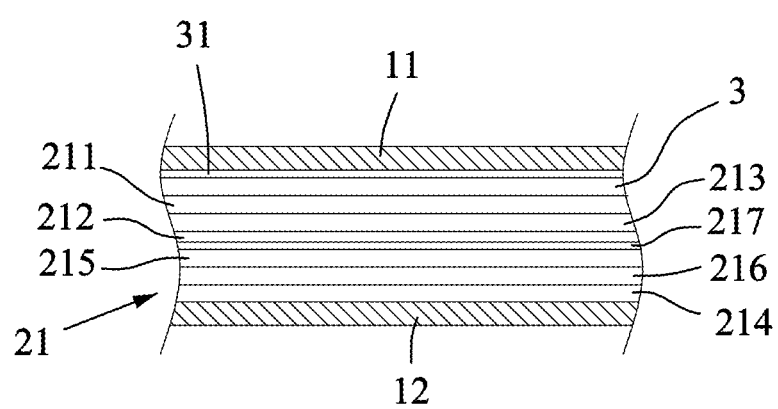
FIG. 6 is a section schematic diagram of a circuit carrier board according to a fourth embodiment of the present disclosure.

Referring to FIG. 6, as shown in the drawing, in addition to the embodiments above, in one embodiment of the present disclosure, a second conductor layer 217 can further be disposed between the second separation layer 215 and the first circuit layer 212, thereby enabling the circuit carrier board 21 to better meet actual application requirements.

The present disclosure is described by way of the preferred embodiments above. A person skilled in the art should understand that these embodiments are merely for describing the present disclosure and are not to be construed as limitations to the scope of the present disclosure. It should be noted that all equivalent changes, replacements and substitutions made to the embodiments are to be encompassed within the scope of the present disclosure. Therefore, the scope of protection of the present disclosure should be accorded with the broadest interpretation of the appended claims.

What is claimed is:

1. A flexible card having a transaction display, comprising:
   a flexible card body, comprising a first plate and a second plate, the first plate and the second plate combined with each other;
   a flexible electric control mechanism, disposed between the first plate and the second plate, the flexible electric control mechanism comprising a circuit carrier board and a transaction processing mechanism, the transaction processing mechanism disposed on the circuit carrier board and performing a transaction with a payment apparatus;
   a flexible display unit, disposed on the circuit carrier board and electrically connected to the transaction processing mechanism, the flexible display unit providing a prompt when used in a transaction; and
   a light emitting unit, disposed on the circuit carrier board and electrically connected to the transaction processing mechanism, the light emitting diode providing the prompt when used in the transaction,
   wherein the circuit carrier board comprises a graphics layer, a first circuit layer, a first separation layer and a first conductor layer, wherein the first circuit layer is disposed on the first conductor layer, the first separation layer is disposed on one surface of the first circuit layer, the graphics layer is disposed on one surface of the first separation layer, and the flexible display unit is disposed on one surface of the graphics layer.

2. The flexible card having a transaction display according to claim 1, further comprising a second separation layer disposed between the first circuit layer and the first conductor layer.

3. The flexible card having a transaction display according to claim 1, wherein the transaction processing mechanism is a central processor, an integrated circuit chip or a logic circuit.

4. The flexible card having a transaction display according to claim 1, wherein the flexible display unit is an electrophoretic display, a liquid crystal display, a bistable liquid crystal display, a multistable liquid crystal display, a flexible organic light emitting diode display, a flexible light emitting diode display or a flexible liquid crystal display.

5. The flexible card having a transaction display according to claim 1, wherein the flexible display unit further comprises a protection layer, which covers the flexible display unit.

6. The flexible card having a transaction display according to claim 1, wherein the light emitting unit is provided with at least one light emitting portion and a light guiding portion, the light guiding portion encircles a periphery of the flexible card body, and the light emitting portion corresponds to the light guiding portion.

7. The flexible card having a transaction display according to claim 6, wherein the light emitting portion is a light emitting diode, and the light guiding portion is a light guiding ink layer.

8. A flexible card having a transaction display, comprising:
   a flexible card body, comprising a first plate and a second plate, the first plate and the second plate combined with each other;
   a flexible electric control mechanism, disposed between the first plate and the second plate, the flexible electric control mechanism comprising a circuit carrier board and a transaction processing mechanism, the transaction processing mechanism disposed on the circuit carrier board and performing a transaction with a payment apparatus;
   a flexible display unit, disposed on the circuit carrier board and electrically connected to the transaction processing mechanism, the flexible display unit providing a prompt when used in a transaction; and
   a light emitting unit, disposed on the circuit carrier board and electrically connected to the transaction processing mechanism, the light emitting diode providing the prompt when used in the transaction, wherein the circuit carrier board comprises a graphics layer, a first circuit layer, a first separation layer, a first conductor layer, a second separation layer and a second circuit layer, wherein the second circuit layer is disposed on one surface of the first conductor layer, the second separation layer is disposed on one surface of the second circuit layer, the first circuit layer is disposed on one surface of the second separation layer, the first separation layer is disposed on one surface of the first circuit layer, the graphics layer is disposed on one surface of the first separation layer, and the flexible display unit is disposed on one surface of the graphics layer.

9. The flexible card having a transaction display according to claim 8, further comprising a second conductor layer disposed between the second separation layer and the first circuit layer.

* * * * *